(12) United States Patent
Roselle et al.

(10) Patent No.: US 7,749,401 B2
(45) Date of Patent: Jul. 6, 2010

(54) SELF-STEAMING BENEFIT COMPOSITION

(75) Inventors: Brian Joseph Roselle, Fairfield, OH (US); Robert Henry Rohrbaugh, Hamilton, OH (US); Paul Amaat Raymond Gerard France, West Chester, OH (US); Vincent York-Leung Wong, Hamilton, OH (US); Kenneth John Edelman, Wyoming, OH (US); Julia Ann Glazer, Cincinnati, OH (US); John Philip Stoddard, Ben Lomond, CA (US); Joseph Hei, Palo Alto, CA (US); Samuel B. Truslow, San Francisco, CA (US); Velma Luisa Velazquez, Boulder Creek, CA (US)

(73) Assignee: The Procter & Gamble Company, Cincinnati, OH (US)

( * ) Notice: Subject to any disclaimer, the term of this patent is extended or adjusted under 35 U.S.C. 154(b) by 855 days.

(21) Appl. No.: 11/140,280

(22) Filed: May 27, 2005

(65) Prior Publication Data

US 2006/0030745 A1 Feb. 9, 2006

Related U.S. Application Data

(60) Provisional application No. 60/574,758, filed on May 27, 2004.

(51) Int. Cl.
*D06M 23/06* (2006.01)
(52) U.S. Cl. .................... 252/8.91; 252/67; 252/71; 252/183.13; 38/44; 38/69; 38/144
(58) Field of Classification Search ............... 252/67, 252/8.91, 71, 183.13; 38/44, 69, 144
See application file for complete search history.

(56) References Cited

U.S. PATENT DOCUMENTS

| | | | |
|---|---|---|---|
| 5,560,385 A | 10/1996 | Zheng | |
| 5,664,596 A | 9/1997 | Zheng | |
| 5,800,067 A | 9/1998 | Easter | |
| 5,816,279 A | 10/1998 | Zheng | |
| 5,971,188 A | 10/1999 | Kellogg et al. | |
| 6,006,772 A | 12/1999 | Zheng | |
| 6,409,746 B1 * | 6/2002 | Igaki et al. | 607/109 |
| 2001/0042546 A1 * | 11/2001 | Umeda et al. | 128/206.21 |
| 2002/0053607 A1 | 5/2002 | Gaaloul et al. | |
| 2002/0079329 A1 | 6/2002 | Verherbrugghen et al. | |
| 2002/0154011 A1 | 10/2002 | Pasin et al. | |
| 2003/0010371 A1 | 1/2003 | Langley | |
| 2004/0035410 A1 * | 2/2004 | Igaki et al. | 126/263.05 |
| 2004/0042965 A1 * | 3/2004 | Usui et al. | 424/40 |
| 2004/0217325 A1 * | 11/2004 | Usui et al. | 252/70 |
| 2005/0262757 A1 * | 12/2005 | Wong et al. | 44/250 |
| 2006/0154006 A1 * | 7/2006 | Usui et al. | 428/34.1 |

FOREIGN PATENT DOCUMENTS

| | | |
|---|---|---|
| CN | 1399256 A | 2/2003 |
| EP | 0 324 589 | 7/1989 |
| EP | 1 147 752 A1 | 10/2001 |
| EP | 1 181 911 A1 | 2/2002 |
| EP | 1 215 330 A1 | 6/2002 |
| EP | 1 393 699 A1 | 3/2004 |
| JP | 02-237599 A | 9/1990 |
| JP | 1993096001 A | 4/1993 |
| JP | 1997192398 A | 7/1997 |
| WO | WO 99/51174 | 10/1999 |
| WO | WO 00/19001 | 4/2000 |
| WO | WO 00/52249 | 9/2000 |
| WO | WO 00/75413 A1 | 12/2000 |
| WO | WO 02/098763 A1 | 12/2002 |
| WO | WO 03/045188 A1 | 6/2003 |
| WO | 03/097764 * | 11/2003 |

\* cited by examiner

*Primary Examiner*—Lorna M Douyon
*Assistant Examiner*—Amina Khan
(74) *Attorney, Agent, or Firm*—Julia A. Glazer; Leonard W. Lewis; Steven W. Miller

(57) ABSTRACT

Self-steaming benefit compositions for treating fabrics are described. The present invention relates to compositions which are both self-steaming and include one or more benefit agents to provide benefits to fabrics. The present invention also relates to a method for treating fabrics utilizing the self-steaming benefit compositions of the present invention.

10 Claims, 11 Drawing Sheets

SELF-STEAMING BENEFIT COMPOSITION

CROSS REFERENCE TO RELATED APPLICATIONS

This application claims the benefit of U.S. Provisional Application Ser. No. 60/574,758 filed on May 27, 2004.

FIELD

The present invention relates to self-steaming benefit compositions for treating fabrics. The present invention also relates to a method for treating fabrics utilizing the self-steaming benefit compositions of the present invention. The invention further relates to a kit for treating fabrics.

BACKGROUND

One difficulty associated with utilizing steam to clean/refresh fabrics is the requirement of a separate heat source to generate the steam needed to clean/refresh the fabric. The present invention addresses this drawback by providing a composition which is self-steaming. The composition may also include one or more benefit agent to provide benefits to fabrics. This and other features, aspects, advantages, and variations of the present invention will become evident to those skilled in the art from a reading of the present disclosure with the appended claims and are covered within the scope of the claims.

SUMMARY

A self-steaming benefit composition for treating fabric is provided. The self-steaming benefit composition has a steam generation rate of at least about $2\times10^{-5}$ grams/minute of steam. In one non-limiting embodiment, the self-steaming benefit composition comprises:

a) from about 30% to about 80% by weight iron powder;
b) from about 0.5% to about 25% by weight carbon;
c) from about 0.5% to about 10% by weight of metal salt;
d) from about 1% to about 60% by weight of water;
e) from about 0.1% to about 30% by weight of a water manager; and
f) oxygen at an amount sufficient to support the generation of steam.

A self-steaming benefit composition article is also provided. The article may be comprised of a substantially planar laminate structure having at least one steam-generating cell embedded between multiple layers of a nonwoven material that are laminated together wherein at least one steam-generating cell is capable of producing a steam generation rate of at least about $2\times10^{-5}$ grams/minute of steam.

An enclosure is also provided. The enclosure may be a bag, a cabinet, the core of a fabric roller, a washing machine, a fabric article drying appliance, or a combination thereof. The enclosure may also be a closet. The enclosure may be self-expanding. The self-steaming benefit composition may be delivered in the enclosure or it may be delivered to a point outside of the enclosure.

A kit comprising a self-steaming benefit composition and an enclosure is also provided. The self-steaming benefit composition may be in the form of an article. A method for treating fabric is also provided. One non-limiting method includes:

a) providing an enclosure;
b) providing a self-steaming benefit composition within the enclosure; and
c) activating the self-steaming benefit composition so that the steam at peak production produces at least about $2\times10^{-5}$ grams/minute of steam.

Another non-limiting method includes:

a) providing an enclosure;
b) providing a source of a self-steaming benefit composition;
c) providing a conduit from the source of the self-steaming benefit composition to the interior of the enclosure; and
d) activating the self-steaming benefit composition so that the steam at peak production produces at least about $2\times10^{-5}$ grams/minute of steam.

BRIEF DESCRIPTION OF THE DRAWINGS

It is believed that the present invention will be better understood from the following description taken in conjunction with the accompanying drawings in which.

DETAILED DESCRIPTION

Figure 1:
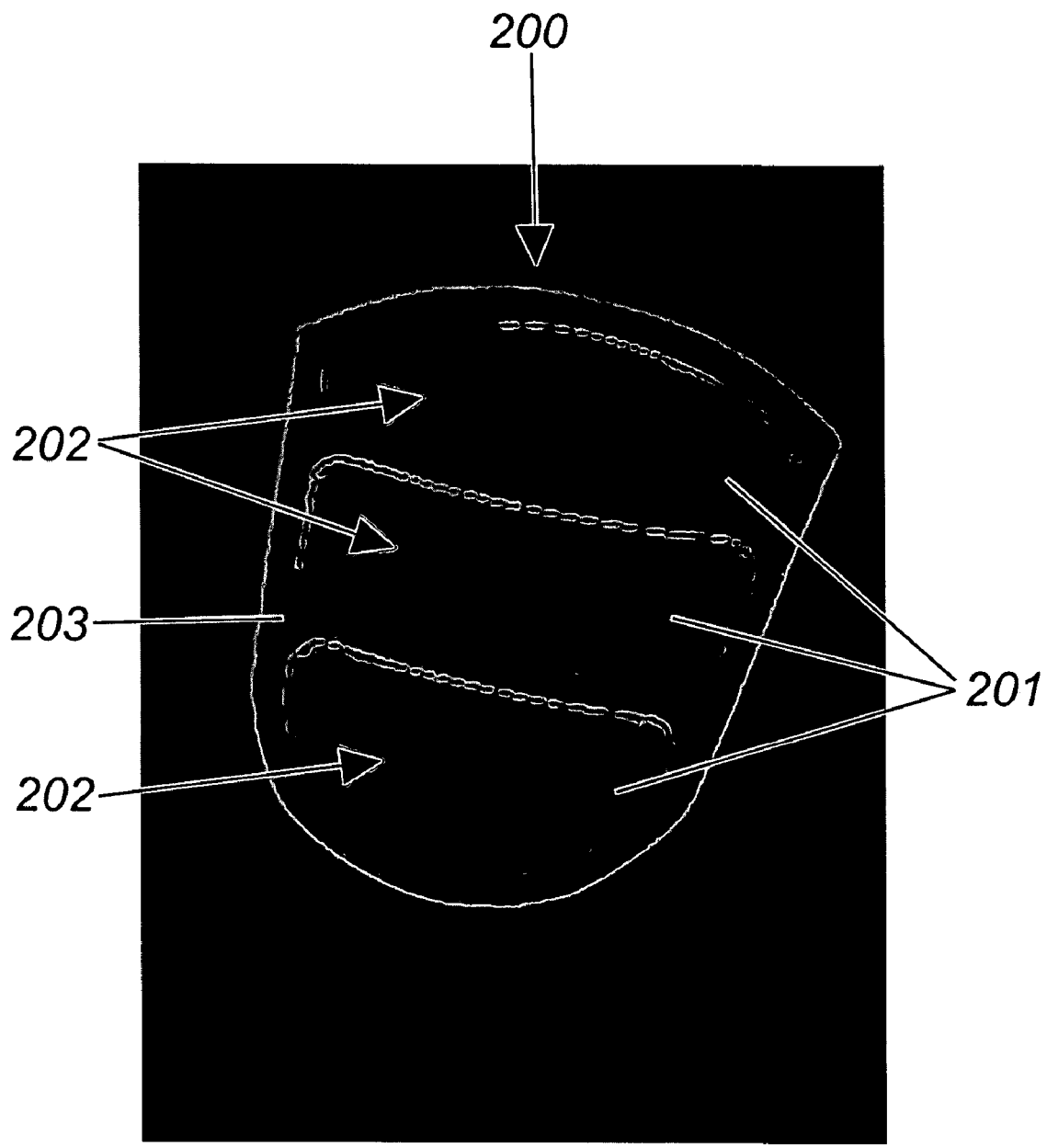
FIG. 1 is a top view of an embodiment of a self-steaming benefit composition article made in accordance with the present invention.

Reference will now be made in detail to various embodiments of the present invention, examples of which are illustrated in the accompanying drawings wherein like numerals indicate the same elements throughout the views. All percentages, ratios and proportions herein are on a weight basis unless otherwise indicated.

Except as otherwise noted, all amounts including quantities, percentages, portions, and proportions, are understood to be modified by the word "about", and amounts are not intended to indicate significant digits.

Except as otherwise noted, the articles "a", "an", and "the" mean "one or more".

As used herein, "comprising" means that other steps and other ingredients which do not affect the end result can be added. This term encompasses the terms "consisting of" and "consisting essentially of". The compositions and methods/processes of the present invention can comprise, consist of, and consist essentially of the essential elements and limitations of the invention described herein, as well as any of the additional or optional ingredients, components, steps, or limitations described herein.

As used herein, "self-steaming" means possessing the ability to generate steam from water inherent to the self-steaming entity with the steam having the ability to be released from the entity. In accordance with this invention, the ability to self-generate steam does not rely on the input of energy from sources separate from the self-steaming entity.

As used herein "steam" refers to vaporized water as an invisible gas and can include the visible mist that condenses therefrom.

As used herein, "benefit composition" refers to a composition used to deliver a benefit to a fabric article. A benefit composition may be comprised of one or more "benefit agents". Non-limiting examples of materials and mixtures thereof which can comprise benefit agents and/or be included as part of a benefit composition include: water (in any form including steam), softening agents, crispening agents, perfume, water/stain repellents, refreshing agents, antistatic agents, antimicrobial agents, durable press agents, wrinkle resistant agents, wrinkle release agents, odor resistance agents, abrasion resistance agents, solvents, and combinations thereof.

As used herein the term "fabric" encompasses articles of fabric including but not limited to: clothing, linen, draperies, clothing accessories, leather, floor coverings, and the like. The term also encompasses other items made in whole or in part of fabric, such as tote bags, furniture covers, tarpaulins, shoes, and the like.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Self-Steaming Benefit Composition

The self-steaming benefit composition of the present invention comprises a composition which is capable of self-generating steam and providing a benefit to fabric.

A. Self-Steaming Component

The self-steaming component of the present invention comprises mixtures of materials which when reacted together will produce steam. The steam produced therefrom may also be considered a benefit agent.

In one non-limiting embodiment, the self-steaming ingredients of the present invention may comprise a particulate exothermic composition which comprises iron powder, oxygen, carbon, a metal salt, water, and an optional additional water-releasing component.

Iron Powder

Iron is the anode for the electrochemical reaction involved in the exothermic oxidation of iron. Suitable sources for iron powder include cast iron powder, reduced iron powder, electrolytic iron powder, scrap iron powder, pig iron, wrought iron, various steels, iron alloys, and the like and treated varieties of these iron powders. There is no particular limitation to their purity, kind, etc. so long as it can be used to produce steam-generation with electrically conducting water and air. Typically, the oxygen content (which may be measured as hydrogen loss) of the iron should be less than about 1%. A suitable method for measuring hydrogen loss is the MPIF (Metal Powders Industry Federation) Standard 02 entitled "Determination of Loss of Mass in Hydrogen for Metal Powders".

Typically, sponge (porous) iron is used and may be particularly advantageous due to the high internal surface area of this iron source. As the internal surface area is orders of magnitude greater than the external surface area, reactivity may not be controlled by particle size. Non-limiting examples of sponge iron include M-100 and F-417, commercially available from Hoeganaes Corporation of Riverton, N.J.

Typically, the iron powder comprises from about 30% to about 80% by weight, or from about 50% to about 70% by weight of the particulate exothermic composition of the present invention.

Oxygen

Oxygen is needed for the oxidation reaction of iron to occur. Oxygen needs to be available to react with iron at a rate sufficient to support the generation of steam. It is desirable that at least about $2 \times 10^{-5}$ grams/minute of steam be produced.

The oxygen source may be either an internal oxygen source contained within the steam-generating cells of the present invention or an external source of oxygen. One non-limiting example of an internal oxygen source would be hydrogen peroxide contained within the cells. Non-limiting examples of external oxygen sources useful in this invention include air and/or artificially made oxygen of various purity.

In one non-limiting example, oxygen may be supplied by air surrounding the composition. It may be desirable to separate oxygen-producing chemical materials incorporated in the particulate exothermic composition at the time of preparation. For example, a gas impermeable film barrier may be used to separate the iron mixture from air. In another non-limiting example if an oxygen source like hydrogen peroxide is used, an additional barrier would typically be used to separate the oxidizing liquid and iron.

Activated and Non-activated Carbon

Activated carbon may be used as a catalyst for the iron oxidation reaction. Specifically, activated carbon when wet has the ability to adsorb oxygen. Activated carbon may also serve as the cathode for the electrochemical reaction involved in the exothermic oxidation of iron. Furthermore, activated carbon may serve as a water-releasing agent as it can facilitate the release of water due to its extremely porous inner structure thus allowing it to temporarily retain water until the steam generation process begins. Further, activated carbon can adsorb odors such as those that may be caused by the oxidation of iron powder.

Activated carbon prepared from coconut shell, wood, charcoal, coal, bone coal, etc. is useful, but activated carbon prepared from other raw materials such as animal products, natural gas, fats, oils and resins is also useful in the steam-generating cells of the present invention. There is no limitation to the kinds of activated carbon used. The cathode capabilities can be extended by using non-activated carbon powder, i.e., carbon blended to reduce cost. Therefore, mixtures of the above carbons are useful in the present invention as well.

Typically, activated carbon, non-activated carbon, and mixtures thereof, comprise from about 0.5% to about 25%, or from about 1% to about 20%, or from about 2% to about 15% by weight, of the self-steaming component.

Metal Salts

The metal salt serves as a reaction promoter for activating the surface of the iron powder to ease the oxidation reaction with air and provides electrical conduction to the exothermic composition to sustain the corrosive reaction. Useful metal salts include sulfates such as ferric sulfate, potassium sulfate, sodium sulfate, manganese sulfate, magnesium sulfate, calcium sulfate; and chlorides such as cupric chloride, potassium chloride, sodium chloride, calcium chloride, manganese chloride, magnesium chloride and cuprous chloride. Also, carbonate salts, acetate salts, nitrates, nitrites and other salts can be used. In general, several suitable alkali, alkaline earth, and transition metal salts exist which can also be used, alone or in combination, to sustain the corrosive reaction of iron.

Though the salts described above can all be used, chloride salts are typically used. While not wishing to be bound by theory, chloride salts are commonly used given their ability to promote the electrochemical oxidation reaction of the iron. Typically, the metal salt(s) comprises from about 0.5% to about 10% by weight, or from about 1.0% to about 5% by weight, of the self-steaming component of the present invention.

Water

The water used herein may be from any appropriate source. Tap water, softened water, distilled water, or deionized water are typically used. Water generally comprises from about 1% to about 60% by weight, or from about 10% to about 30% by weight, of the particulate exothermic composition of the present invention. When water is consumed in a reaction where heat and steam are released, an excess of water beyond the stoichiometric amount needed for the reaction is necessarily added to provide a source of water used for producing steam.

Water can be incorporated directly in the composition in the form of liquid water or water that is physically or chemically held to a separate water manager or water releaser may be used, or a combination thereof.

Water Manager

A water manager can be included as a part of the self-steaming component. As used herein the terms "water manager", "water-releasing agent", "water-releasing component" and "water-releasing material" are used interchangeably to refer to something that will hold or retain water physically or chemically and which will release the water at the appropriate time typically upon the application of heat. While not wishing to be bound by theory, it is believed that a water manager can facilitate the generation of an increased volume of steam by releasing water at a controlled rate. Furthermore, the water manager can prevent or inhibit water from entering, or being maintained in, the interstitial voids of the various particles of the composition, thereby helping to prevent or inhibit flooding.

Non-limiting examples of suitable water managers include vermiculite, porous silicates, wood powder, wood flour, cotton cloth having a large amount of fluffs, short fibers of cotton, paper scrap, vegetable matter, super absorbent water-swellable or water-soluble polymers and resins, acrylic-based polymers such as absorbent gelling material ("AGM"), carboxymethylcellulose salts, and other porous materials having a large capillary function and hydrophilic property can be used. Hydrated inorganic salts may be used as a water manager if the dehydration temperature of the hydrate is less than or equal to the maximum temperature of the self-steaming reaction. Typically, the water manager comprises from about 0.1% to about 30% by weight, or from about 0.5% to about 20% by weight, or from about 1% to about 10% by weight, of the particulate exothermic composition of the present invention. The ratio of the water manager component to the water is typically from about 0.001:1 to about 0.2:1, or from about 0.01:1 to about 0.17:1, or from about 0.05:1 to about 0.12:1, all by weight.

The water manager may have a mean particle size in microns greater than about 250 microns, or at least about 400 microns, or from about 400 microns to about 800 microns. The mean particle size of a given component may be measured using a HORIBA LA-910 laser scattering particle size distribution analyzer (Horiba, Calif.), or other instrument providing substantially similar results. In addition to instrumentation methods, sieve analysis may also be utilized to determine mean particle size.

Additional Materials

In addition to the above-described materials the self-steaming component of the present invention may also include additional materials as appropriate. Other additional materials which may optionally be used include oxidation reaction enhancers such as elemental chromium, manganese, or copper, compounds comprising these elements, or mixtures thereof; hydrogen gas inhibitors such as inorganic or organic alkali compounds or alkali weak acid salts including sodium hydroxide, potassium hydroxide, sodium hydrogen carbonate, sodium carbonate, calcium hydroxide, calcium carbonate, sodium thiosulfate salts, and sodium propionate; fillers such as natural cellulosic fragments including wood dust, cotton linter, and cellulose, synthetic fibers in fragmentary form including polyester fibers, foamed synthetic resins such as foamed polystyrene and polyurethane, and inorganic compounds including silica powder, porous silica gel, sodium sulfate, barium sulfate, iron oxides, and alumina; and anti-caking agents such as tricalcium phosphate and sodium silicoaluminate.

Such components also include thickeners such as corn-starch, potato starch, carboxymethylcellulose, and α-starch, and surfactants such as those included within the anionic, cationic, nonionic, zwitterionic, and amphoteric types. Still other additional components which may be added to the particulate exothermic compositions of the present invention, as appropriate, include extending agents such as metasilicates, zirconium, and ceramics.

Additional Non-Limiting Example(s) of Self-Steaming Components

Other non-limiting examples of suitable self-steaming components are disclosed in U.S. Pat. Nos. 4,017,414; 4,264,362; 4,522,190; and 5,611,329, wherein a super corroding alloy is reacted with an electrolyte salt solution or water added to a mixture of the super corroding alloy and salt. Typically magnesium with a small amount of iron incorporated in the magnesium is reacted with a sodium chloride aqueous solution to produce heat and steam. The reaction stoichiometry can be described as $Mg+2H_2O \rightarrow Mg(OH)_2 + H_2 + heat$. When utilizing this reaction, it is desirable to add excess water beyond the stoichiometric amount needed to make steam.

One possible means of doing this would be to utilize a powder mix which consists of 7.5 grams of magnesium which is comprised of 5 atomic % of iron supercorroding alloy, approximately 0.7 grams inert filler, 0.5 grams NaCl, and approximately 0.3 grams of antifoaming agents. The powder mix can be contained in pockets. The pockets can be formed by a first sheet of relatively flexible polymer which is gas and water permeable and that is bonded to a second sheet of relatively flexible polymer which is also gas and water permeable to form a plurality of pockets with the first sheet. The sheets forming the pockets can include surfactant coating to help with wetting. Water in the amount of 40 grams would then be allowed to flow onto the pocketed sheets containing the powder mix thereby initiating the self-steaming reaction. It is the water flowing through the pockets to the powder which starts the overall reactions described above. Excess water above the stoichiometric amount would then be converted to steam.

Activation of this system could be accomplished by including a rupturable seal between the water and powder mix pocket which upon rupture would allow the water to mix. Alternatively, the water could be added by other dispensing means such as pouring by hand.

When utilizing self-steaming reactions, it may be desirable to manage the $H_2$ released in use. Non-limiting ways to do this include incorporating an $H_2$ adsorber or reactant to effectively tie-up or remove $H_2$.

In another approach, similar to that which is disclosed U.S. Pat. No. 5,935,486, a solid heater material may be activated by the addition of water or an aqueous solution. The heater material may consist of an acid anhydride or salt together with a basic anhydride or salt, such that the addition of water to both the acidic and basic anhydrides produces heat as well as acid and base respectively. Subsequent reaction of the acid and base produces additional heat, as well as a neutral product. Addition of a sufficient amount of water to provide some excess beyond what the base reaction uses allows the heat to convert the water to steam, with the latent heat of vaporization helping control the temperature of the overall mixture.

One possible means of doing this would be to use $P_2O_5$ and CaO extruded into pellets. The $P_2O_5$/CaO (1:1 by weight) composition would be extruded in the form of pellets. The heater material would be formed by mixing the solid powders ($P_2O_5$ and CaO), adding inert liquids to control the rate of heat production and facilitate processing, and extruding the composition using a ram extruder, screw extruder, pellet mill, or the like. In one prophetic example, the composition would be prepared by mixing CaO and $P_2O_5$ in equal weight ratios, then adding 15.4% of a liquid consisting of 74% white mineral oil and 26% of a surfactant. A suitable surfactant for this purpose might be a phosphate ester such as ACTRAFOS 216 available from Georgia Pacific Resins of Atlanta, Ga. The pellets would then be extruded through a 0.125 inch (0.318 cm) die on a pellet mill, and cutting the extrusions to a length of 0.125 inches (0.318 cm) to 0.5 inches (1.27 cm). The pellets would then be heated to about 100° C. for 0.5 to 1.0 hour. It is believed that heating the pellets may lead to improved performance of the pellets.

Activation of this system also entails the interaction with water. In this example, 40 grams of water would be included with 55 grams of the pellet mix to initiate the self-steaming reaction. Water can be managed/introduced in a manner similar as described above.

In yet another approach, CaO could be used. This would then be activated by interaction with water as described above. If desired a reaction enhancer such as calcium chloride can be added to enhance steam generation.

In another approach, permanganate can be mixed with glycerine to produce heat. Water, in thermal communication with the permanganate/glycerine is then heated to produce steam.

With regard to the self-steaming component of the present invention, so as not to restrict the oxygen transmission within the self-steaming component, it is desirable to maintain the porosity of the chemistry mix. One indicator of porosity is the tapped density of the dry mix of the self-steaming component (i.e.; before water addition during the processing of the self-steaming component). The dry mix of the self-steaming component of the present invention generally has a tapped density of about 1 gram/ml to about 3 grams/ml. A method for determining tapped density is described later in this document.

It is typical to utilize a narrow distribution of particle sizes in the self-steaming component chemistry mix such that about 25% of the iron used in the mix has a particle size diameter of greater than about 250 μm while less than about 25% of the iron has a particle size diameter of less than about 15 μm. A sieve is one suitable method for determining particle size distribution.

In this embodiment, the relative increase of these particle size distributions is contrary to the commonly held belief in the art that fines (such as, for example, fine iron powder) is necessary for rapidity of reaction. Indeed, it is found herein that the aforementioned relatively increased particle size reduces segregation effects among components within the composition, and additionally increases reaction efficiency (e.g., less metal or other material may be necessary). Without intending to be limited by theory, this is based on a finding that the porosity of the mixture of particles utilized may govern reaction rate, rather than (or in addition to) surface area of the metal.

B. Benefit Agent

In addition to the steam generated by the self-steaming component, which may be considered a benefit agent, the present invention may also include one or more additional benefit agents. The additional benefit agent may be present in an amount of about 0.001% to about 25% by weight, about 0.01% to about 15% by weight, or about 0.1% to about 5%. These benefit agents may be individual ingredients or they may be comprised together in a composition or a combination thereof. Non-limiting examples of benefit agent components include water, silicone, starch, wrinkle-releasing agent, perfume, surfactants, perfumes, preservatives, bleaches, auxiliary cleaning agents, fabric shrinkage reducing compositions, organic solvents and mixtures thereof. Non-limiting examples of organic solvents include glycol ethers, specifically, methoxy propoxy propanol, ethoxy propoxy propanol, propoxy propoxy propanol, butoxy propoxy propanol, butoxy propanol, ethanol, isopropanol and mixtures thereof. It should be understood, that the water included with the self-steaming component can also be considered a benefit agent in accordance with the present invention.

Fabric shrinkage reducing compositions that are suitable for use in the present invention include but are not limited to ethylene glycol, all isomers of propanediol, butanediol, pentanediol, hexanediol and mixtures thereof. The fabric shrinkage reducing compositions may include neopentyl glycol, polyethylene glycol, 1,2-propanediol, 1,3-butanediol, 1-octanol and mixtures thereof. The surfactant may be a nonionic surfactant, such as an ethoxylated alcohol or ethoxylated alkyl phenol, and may be present at up to about 2%, by weight of the benefit composition. The benefit composition may optionally include water. If water is present in the benefit composition it typically comprises from about 0.01% to about 95% by weight of water.

A more detailed description of benefit composition components which may be used in the present invention such as the organic solvents, surfactants, perfumes, preservatives, bleaches and auxiliary cleaning agents can be found in U.S. Pat. No. 5,789,368, issued on Aug. 4, 1998 to You et al. and in U.S. Pat. No. 5,912,408, issued on Jun. 15, 1999, to Trinh et al. Shrinkage reducing compositions for use in this invention can be found in WO 00/11133, entitled "Cleaning Compositions that Reduce Fabric Shrinkage", published in the name of Strang et al. on Mar. 2, 2000.

C. Optional Additional Components

The present invention may also include other optional components, a non-limiting example of which is a signal that communicates the status of the self-steaming process or condition of the system to a user. For example, there may be a signal which indicates when treatment has commenced and/or concluded. Non-limiting examples of signals which may be used include color, sound, and/or olfactory signals.

One non-limiting example would include a color changing dye or paint that is sensitive to changes in temperature or humidity. An example of a suitable color changing paint is Kromagen 75 manufactured by TMC U.S.A. of Glenview, Ill. Non-limiting examples of inclusion of the optional additional component includes addition to the enclosure, the self-steaming benefit composition, and/or added to a substrate. When added to the self-steaming benefit composition and/or the substrate, the additional component is added in the amount of from about 0% to about 20% by weight.

Blending

The materials comprising the self-steaming benefit composition may be blended together in any number of ways. For example, when utilizing a self-steaming benefit composition derived from iron oxidation as described above the following non-limiting method may be used for blending the materials. A premix is formed by prewetting carbon with water and adding in the iron, acrylic-based water releaser, salt and sodium thiosulfate and any other additional benefit agents which may be used. For example, if a benefit agent comprising a perfume were to be added in it could be added to the carbon, added to the premix formed, added to a nonwoven substrate that contains the mixture, or a combination thereof.

Self-Steaming Benefit Composition Article

The self-steaming benefit composition article may be disposable. The disposable self-steaming benefit composition article may comprise a substantially planar laminate structure having a single steam-generating cell or a plurality of steam-generating cells embedded between multiple material layers that are laminated together. The steam-generating cell or cells may be fixedly attached to the laminate structure. A self-steaming benefit composition (as described elsewhere) is placed within the cell or cells and a means for allowing oxygen into the composition is provided via a permeable layer on one or more sides and/or portions of the composition. A suitable heat sealable film for this purpose is a polypropylene/ethylene vinyl acetate ("PP/EVA") film available as material No. DH245 from Clopay Plastics of Cincinnati, Ohio.

Some portion of the laminate structure is typically porous. The laminate structure may include a nonwoven. In one non-limiting example the nonwoven may be comprised of an SMMS co-extruded laminate (wherein "SMMS" refers to a spunbond/meltblown/meltblown/spunbond laminate). The meltblown portion may be comprised of one or more layers wherein at least one meltblown layer will typically have a grammage of at least about 8 gsm. While not wishing to be bound by theory, it is believed that in self-steaming benefit compositions utilizing carbon chemistry and a meltblown layer having a grammage of at least about 8 gsm helps prevent carbon powder from exiting the article. A suitable nonwoven is available from Polymer Group International of Waynesboro, Va. as material No. W502FWH.

The self-steaming benefit composition article may be designed to be used once or alternatively can be designed to be used more than once.

Referring to FIGS. 1-2, 3A, and 3B, non-limiting embodiments of self-steaming benefit composition articles are shown. Referring to FIG. 1, an article 200 comprising three pockets is illustrated wherein each pocket 201 contains the self-steaming benefit composition. The self-steaming benefit composition is encased in porous substrate 202. In one non-limiting embodiment porous substrate 202 may be a blend of polyethylene terephthalate ("PET"). This embodiment may also include support structure 203. While not wishing to be bound by theory, it is believed that a support structure may help prevent settling of the contents in the individual pockets. Support structure 203 can be comprised of any material which provides support and which will be familiar to those of ordinary skill in the art, including but not limited to cellulosic and non-cellulosic materials, metallics, plastics, and the like.

Figure 2:
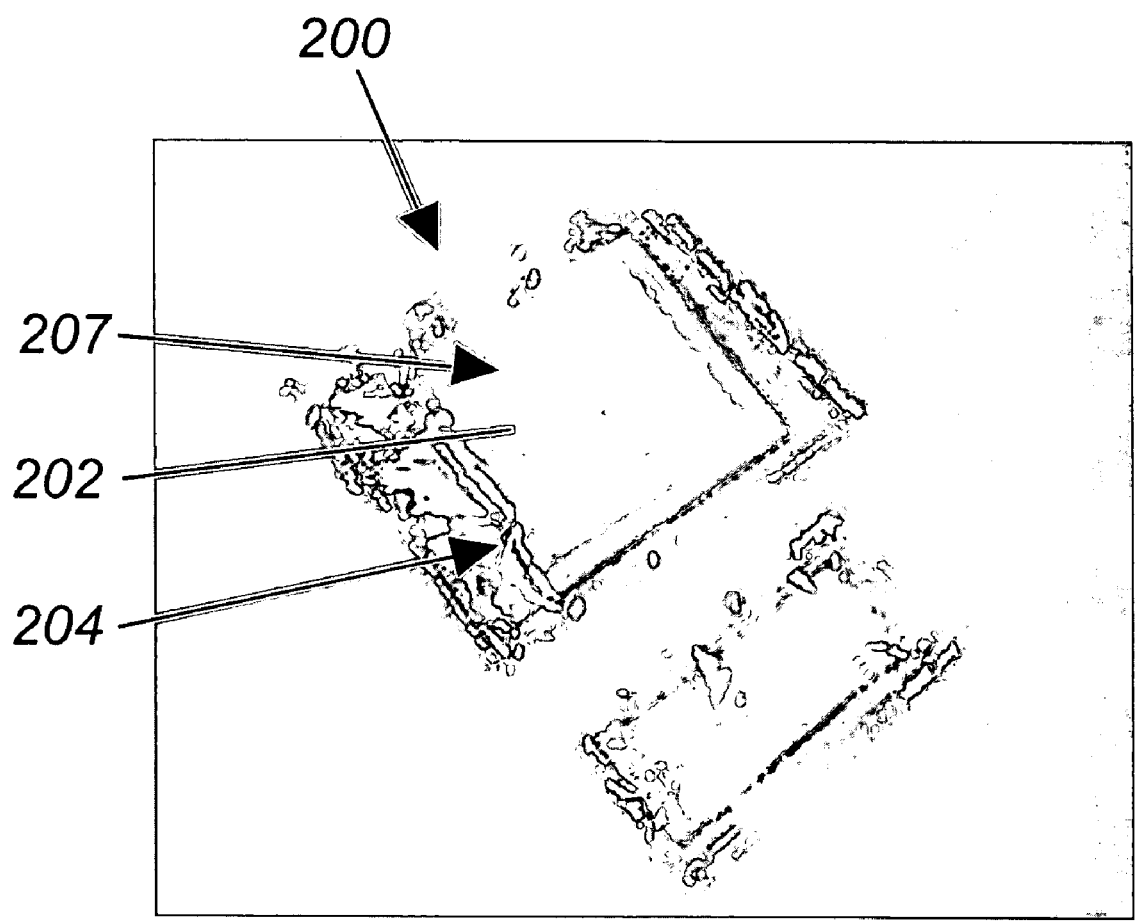
FIG. 2 is a top view of an alternate embodiment of a self-steaming benefit composition article made in accordance with the present invention.

Referring to FIG. 2, in another non-limiting embodiment, self-steaming benefit composition 207 is encased within porous substrate 202. Porous substrate 202 may be PET. Oxygen barrier overwrap 204 encases the self-steaming benefit composition and the porous substrate.

Figure 3A:
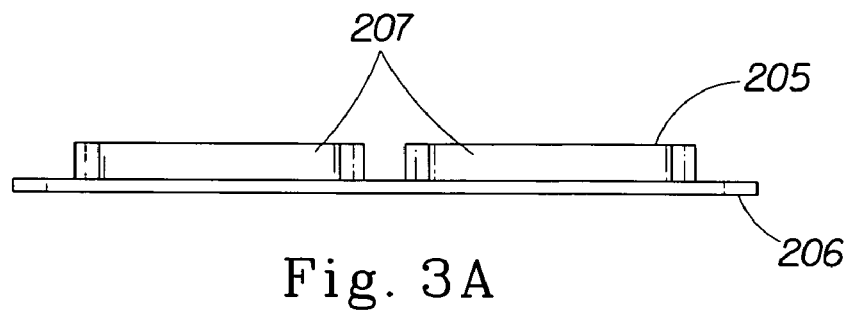
FIG. 3A is a top view of another alternate embodiment of a self-steaming benefit composition article made in accordance with the present invention.
Figure 3B:
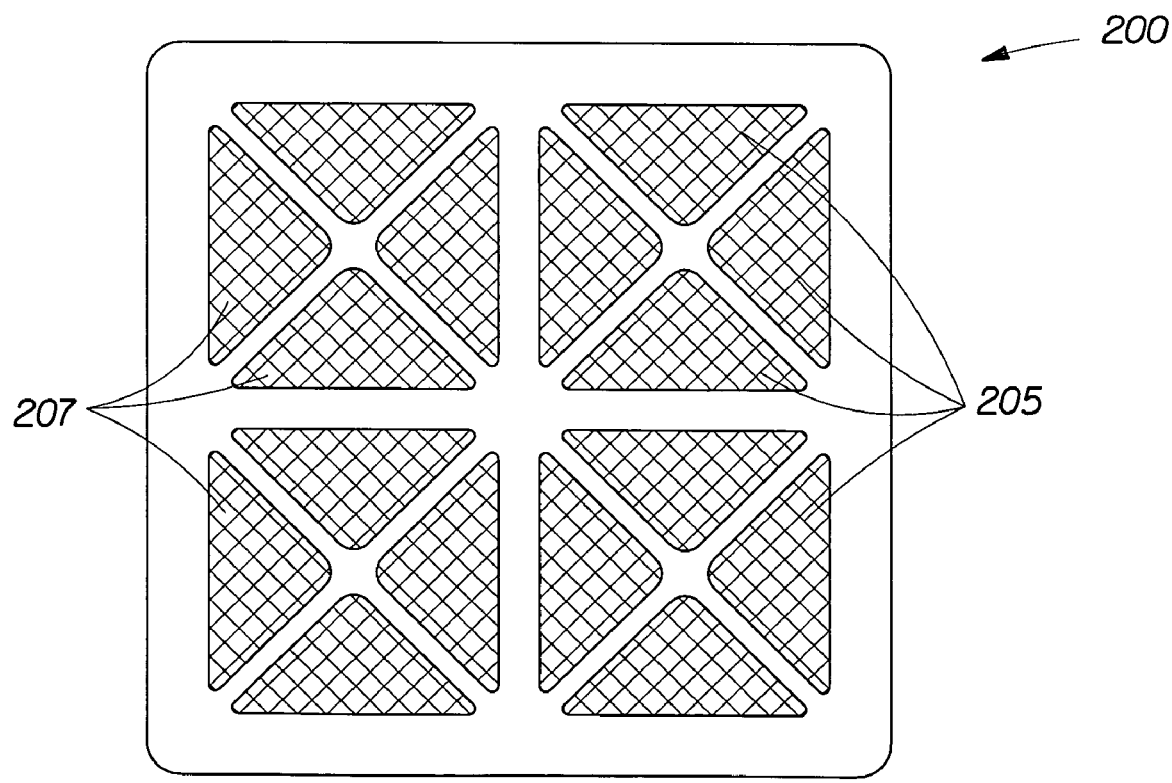
FIG. 3B is a front view of the embodiment of FIG. 3A

Referring to FIGS. 3A and 3B, in yet another non-limiting embodiment of the self-steaming benefit composition article, porous substrate top sheet 205 and nonporous back sheet 206 encompass self-steaming benefit composition 207. In one non-limiting example, the porous top sheet may be comprised of SMMS while the nonporous back sheet may be comprised of PP/EVA. This embodiment could also be folded so that the porous top sheet faces outwardly on both sides such that steam will emanate from both sides of the article.

Activation of the Self-Steaming Benefit Composition

In one non-limiting embodiment based on iron chemistry, the self-steaming benefit composition may be activated as follows: The self-steaming benefit composition article may include an oxygen impermeable plastic overwrap. A tear tab or notch may be included on the overwrap for easy access by a user. Instructions may be included with the package instructing a user to tear open the overwrap to remove the self-steaming benefit composition article. This opening action immediately mixes proximal oxygen contained in the ambient air with the iron mix to initiate the self-steaming process.

For practicality, the self-steaming process is typically designed in such a way that the steaming occurs at the desired time. As such, the composition is generally contained or presented in a manner such that the steaming can be started or activated as needed. For example, the present self-steaming compositions may be contained within an enclosure which is impermeable to air, wherein steaming may be started or activated through disruption of the enclosure.

As an additional or alternate example, for compositions that react to form steam, there may be a barrier between reactive components to prevent the reaction from occurring until desired. In this optional embodiment, the activation of the composition may be achieved by a removal or disruption of a barrier which allows the composition to interact in a manner that will create the desired self-steaming effect.

In the case of iron oxidation, the barrier can be an oxygen impermeable over-wrap around the iron-based mix, or substrate containing the iron-based mix. As indicated above, in this case the composition is activated by simply removing the overwrap allowing oxygen in the air to contact the iron-based mix so as to start the steaming process.

In the case of magnesium-based self-steaming chemistry or calcium oxide-based self-steaming chemistry, the water that is used to start the reaction can be separated by a rupturable barrier in a continuous containment system, or it can be housed in an separate adjacent container that takes a separate physical action to cause the overall composition to come into intimate contact which initiates the steam generation process.

The self-steaming benefit composition may be located within an enclosure or it may be located outside of the enclosure. If the self-steaming benefit composition is activated outside of the enclosure, the steam may be delivered into the enclosure via a conduit that connects the source of the self-steaming benefit composition with the interior of the enclosure. Non-limiting examples of conduits include tubing, pipe, and the like.

Steam Generation

At peak steam production, the self-steaming benefit composition typically generates at least about $2 \times 10^{-5}$ grams/minute of steam and produces at least about $5 \times 10^{-5}$ grams steam/gram of self-steaming benefit composition. Upon activation, the self-steaming benefit composition of the present invention will typically be used at a level so as to generate a relative humidity within an enclosure of between about 50% to about 105%.

Delivery of the Additional Benefit Agent(s)

If an additional benefit agent is utilized in the self-steaming benefit composition, it can be delivered to a fabric in any number of ways in concert with the self-steaming component. The following are some non-limiting examples:

a) Volatilization

The additional benefit agent component can be delivered by direct volatilization of the benefit agent (i.e.; by steam, by heat, or by a combination thereof. In this case the additional benefit agent component is incorporated directly within the self-steaming component or alternatively in or on a substrate wherein the steam is in thermal communication with the substrate so as to release the additional benefit agent component from the substrate. Non-limiting examples include where a perfume is incorporated directly in the self-steaming component or alternately where a perfume is on a non-woven substrate that is in thermal communication with the self-steaming component. The steam volatilizes the perfume such that the perfume is carried away along with the steam.

The additional benefit agent may also be delivered in the form of an azeotrope. As the steam is formed from water, a consistent mix of water and benefit agent can be volatilized off in the form of an azeotrope.

b) Physical Delivery

In another non-limiting example the additional benefit agent may be distributed on to the fabric. For example the additional benefit agent could be included on a substrate. The substrate could then be rubbed over the fabric so as to distribute the benefit agent onto the fabric.

Enclosure

The present invention includes an enclosure. Non-limiting examples of enclosures included within the scope of the present invention include a bag (including but not limited to garment bags), a closet (including but not limited to a clothes closet), a cabinet, the core of a fabric roller (a non-limiting example of which includes a roller for transferring benefits between the roller and the fabric, such as a lint roller), a washing machine, and a fabric article drying appliance (including but not limited to a clothes dryer). The self-steaming benefit composition article may be included within the enclosure. Additionally, fabric(s) to be treated with the self-steaming benefit composition may also be included in the enclosure.

Non-limiting examples of enclosures suitable for use with the present invention are disclosed in WO 00/19001 published on Apr. 6, 2000.

Figure 5:
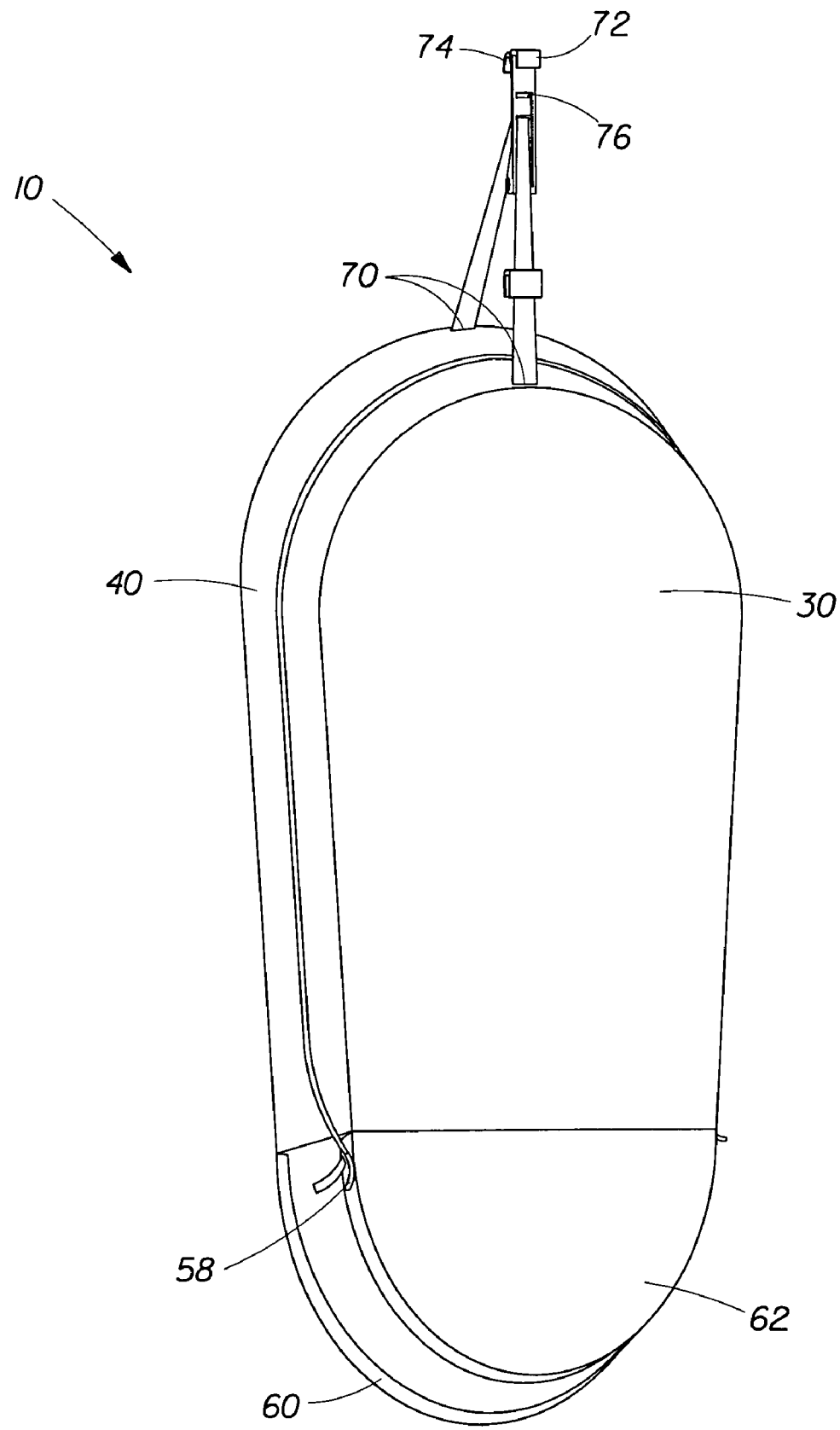
FIG. 5 is a rear perspective view of the enclosure of FIG. 4.
Figure 6:
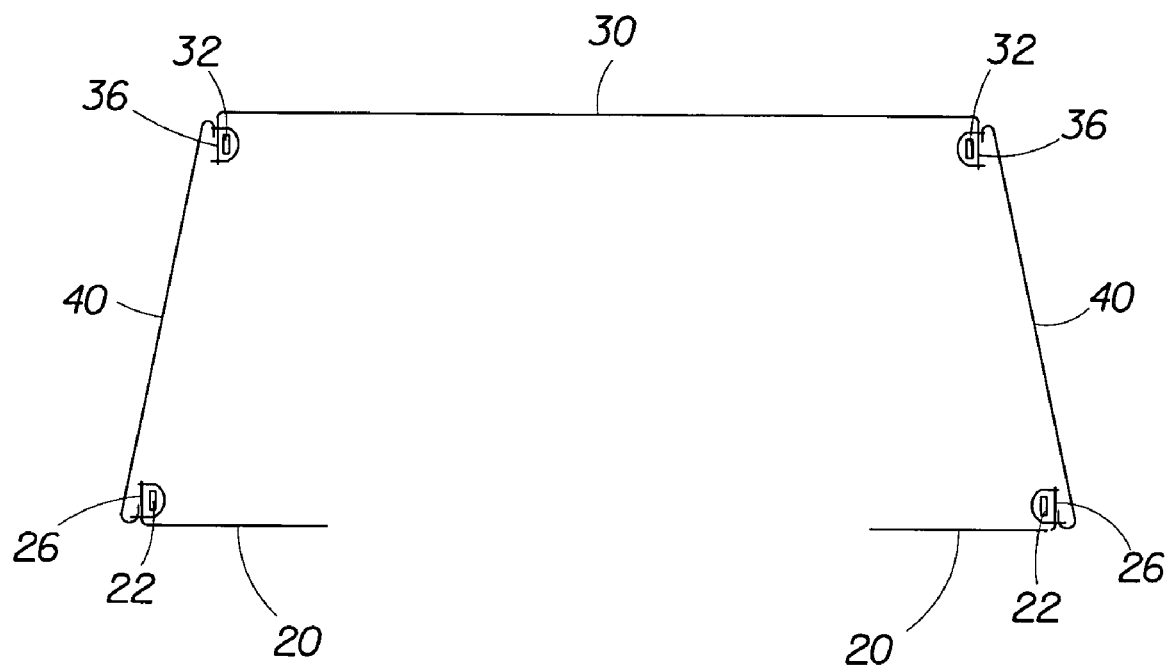
FIG. 6 is a cross-sectional view of the enclosure of FIG. 4 taken across line 6-6.
Figure 7:
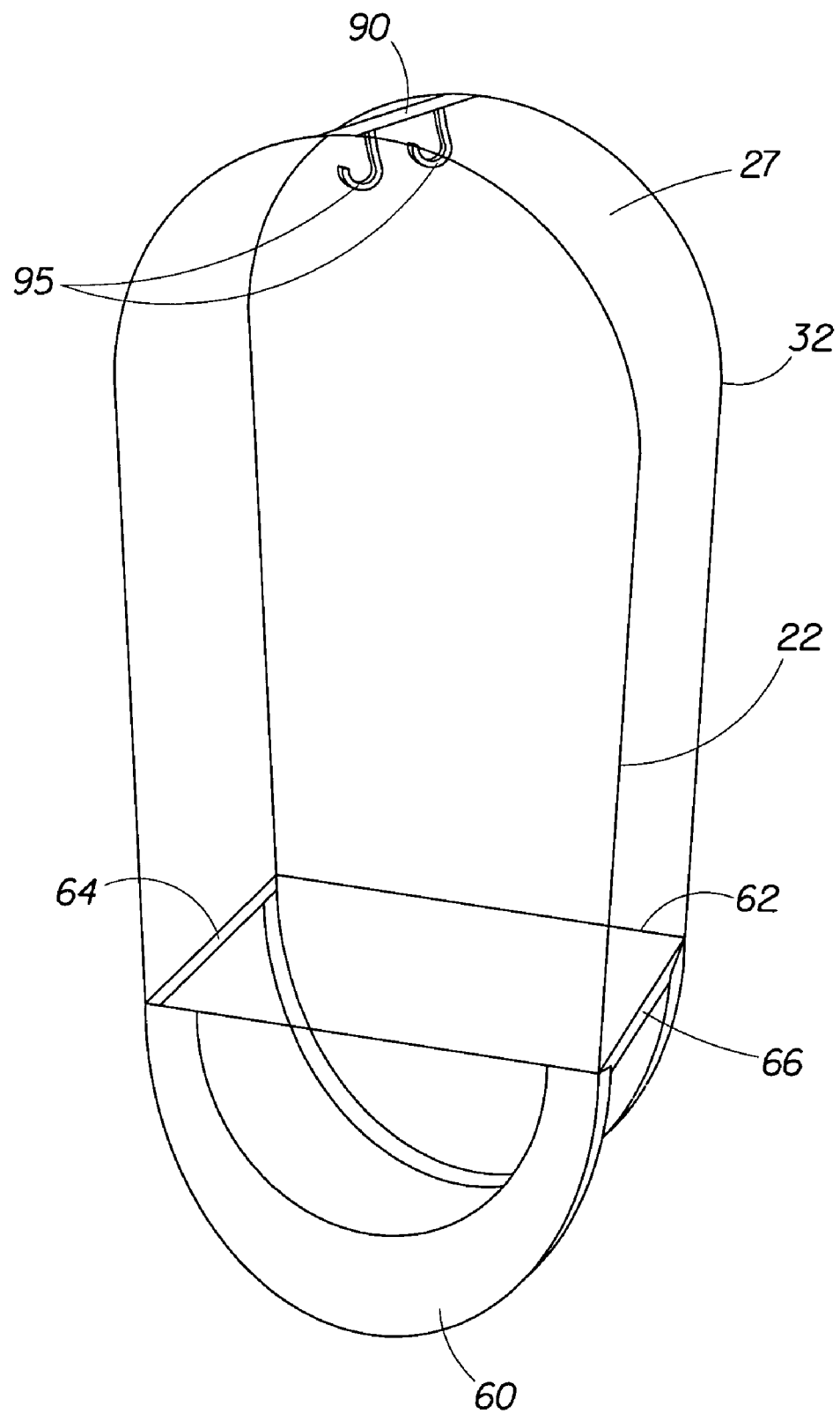
FIG. 7 is a perspective view of the skeleton of the enclosure of FIG. 4.
Figure 8A:
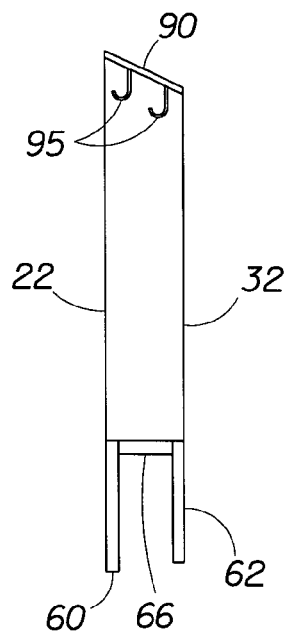
FIGS. 8A-8D are side views showing the enclosure of FIG. 7.
Figure 8B:
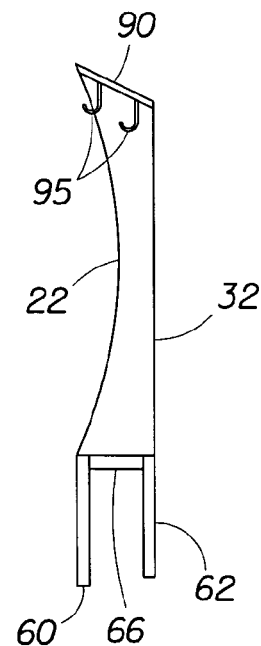
Figure 8C:
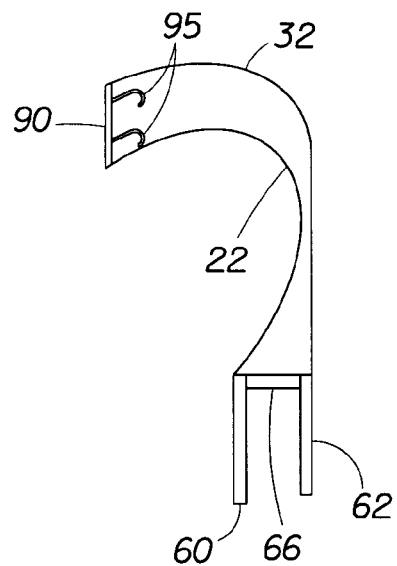
Figure 8D:
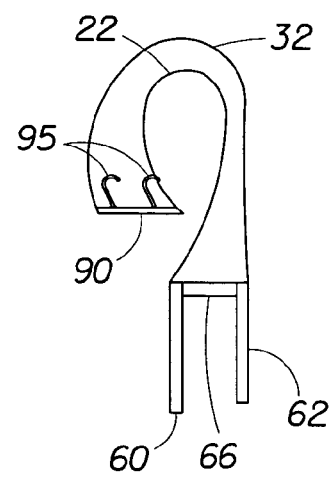

In another embodiment suitable for use with the present invention, a self-expanding enclosure is used as shown in FIGS. 4-10. The embodiment is capable of two orientations including a collapsible orientation and an open orientation. When in a collapsed orientation, the frame members of the enclosure are under tension. Upon placing in an open orientation, the tension is partially released from each frame thereby allowing each frame member to spring forth or pop-up into an open orientation. As used herein the term "self-expanding" refers to the ability of the enclosure to spring open or pop-up on its own from a collapsed state. Referring to FIG. 7, a skeletal view of the embodiment is shown. Included are front frame member 22 and rear frame member 32 which comprise loop frame member 27. Front frame member 22 and rear frame member 32 are looped flexible frames each formed from sufficiently stiff yet resilient material that allows the frames to be coiled. Each frame member is capable of assuming two positions or orientations, one position being an open or expanded position, the other being a folded position in which the frame members are collapsed into a size much smaller than their respective open positions. The frame members can be constructed of any material that fulfills these requirements, including but not limited to spring steel wire, plastic, fiberglass, graphite, or other metal rods or wire. The frame members are held into the desired orientation by the tension of the material between the front frame retaining sleeve 26 and rear frame retaining sleeve 36 and additionally by the front support member 60 and back support member 62 (shown in FIGS. 6 and 7 and discussed further below).

Figure 4:
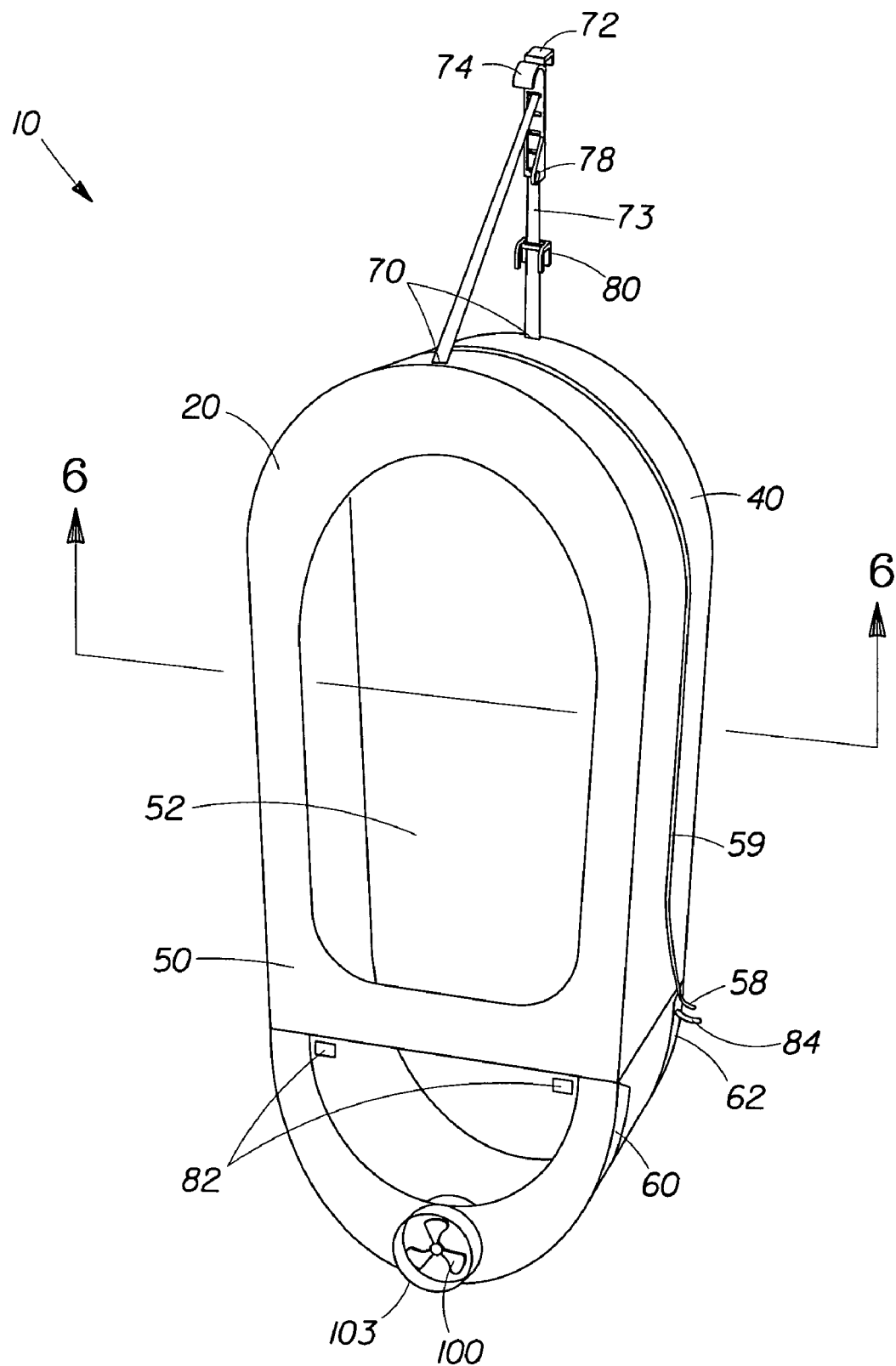
FIG. 4 is a front perspective view of an enclosure made in accordance with the present invention.

Also included are side support members 64 and 66 which are typically located on opposing sides to one another. A front rigid support member 60 and rear rigid support member 62 may be included, as may attachment member 90. An interior hanging member 95 and an exterior hanging member 70 (as shown in FIGS. 4 and 5) may be connected to attachment member 90. Interior hanging member 95 may comprise (but is not limited to) hooks, bars, or the like which may be used to suspend something including but not limited to articles of clothing in the interior of enclosure 10. Exterior hanging member 70 may comprise (but is not limited to) strap 73 with a bracket, hook, or the like for suspending enclosure 10 from a surface. If desired, exterior hanging member 70 can optionally include collapsing hook 80 such as shown in FIG. 4.

The loop frame member 27 (FIG. 7) is covered by a material. The material typically is comprised of a fabric which is generally flexible, foldable, strong, lightweight, and water-resistant non-limiting examples of which include nylon, polyester, micro fiber, plastic, mylar, non-wovens, and the like. The material typically has a moisture vapor transmission rate of less than about 200 grams/m²/day, or less than about 100 grams/m²/day, or less than about 75 grams/m²/day.

Referring to FIGS. 4-7, the material covering loop frame member 27 is comprised of front panel 20, rear panel 30, and side panel 40. Side panel 40 may be comprised for example of a continuous piece of material or discontinuous pieces of material which are connected together to form the panel. In addition to front panel 20, rear panel 30, and side panel 40, front support member 60 and rear support member 62 may be included. These support panels may be rigid or they may be flexible.

Generally, rear panel 30 is covered by a continuous web of material while front panel 20 includes an opening to allow for insertion of objects into enclosure 10. The opening may be a moveable closure member 50 as shown in FIG. 4. Moveable closure member 50 typically overlaps side panel 40 in order to hold the moveable closure in place when in a closed position. Moveable closure member 50 may comprise a door which may be attached to enclosure 10 or alternatively, may be partially attached and/or fully detachable from enclosure 10. The front, rear, and side materials of enclosure 10 are typically comprised of a flexible, foldable, strong, lightweight, water resistant material non-limiting examples of which include nylon, polyester, plastic, mylar, nonwoven, lycra, spandex, or the like. Though any of the materials indicated above are suitable for the moveable closure member 50, typically some portion of the moveable closure member 50 may be comprised of stretchable materials, non-limiting examples of which include lycra and spandex.

Figure 10:
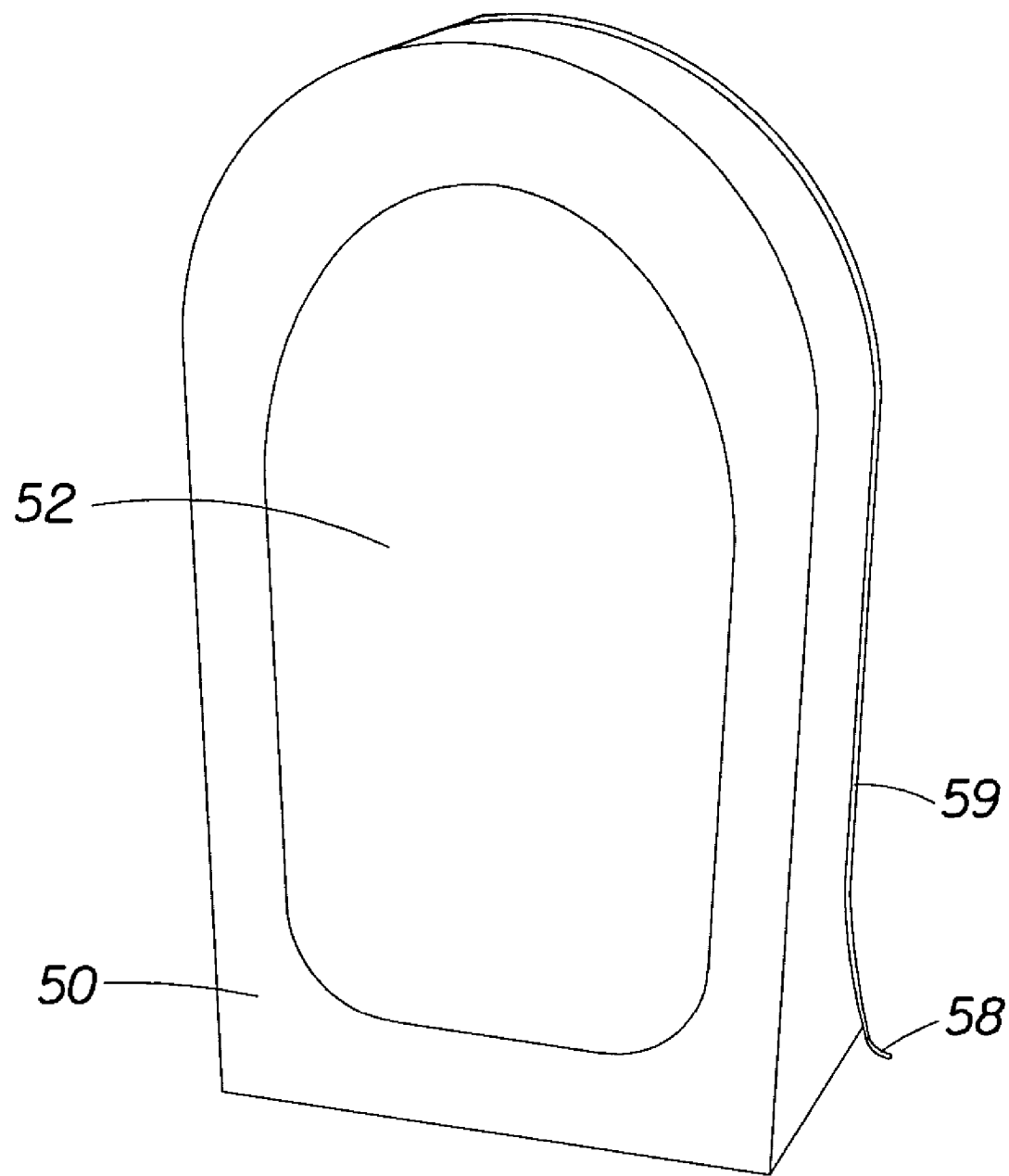
FIG. 10 is a perspective view of a suitable closure member made in accordance with the present invention.

Referring to FIGS. 4-5, and 10, moveable closure member 50 may also include moveable closure retaining sleeve 59 and elastic member 58. The moveable closure-retaining sleeve 59 is formed by a narrow channel in the material. Elastic member 58 is located within the moveable closure-retaining sleeve 59 and its elastic property allows moveable closure member 50 to be held in place around side panel 40. The concept is similar to a fitted bed sheet, wherein the elastic property of the elastic member 58 and the material comprising the moveable closure member 50 provide the ability to stretch the moveable closure member 50 around front frame member 22 and then contract around front frame member 22 to maintain a tight fit and hold moveable closure member 50 in place. One non-limiting example of a suitable elastic member is a bungee cord. Additionally, it would be obvious to one of ordinary skill in the art that other materials could be used for closure purposes, non-limiting examples of which include magnets, zippers, tape, ZIP LOCK® seals, and hook and loop type fasteners, for example VELCRO®.

All or some portion of enclosure 10 may be translucent or transparent for easy viewing into the interior. Referring to FIGS. 4 and 9, enclosure 10 may also include one or more windows 52. The window(s) may be placed anywhere on enclosure 10. In one non-limiting example, the window 52 is located on moveable closure member 50. Window 52 may be transparent. Non-limiting examples of suitable materials from which window 52 can be formed include rigid or flexible transparent material such as polyethylene terephthalate ("PET"), polyethylene terephthalate gycol ("PETG"), polycarbonate ("PC"), vinyl, mylar, or the like, and combinations thereof. Typically, window 52 is of a size large enough to view objects inside enclosure 10 when moveable closure member 50 is closed.

Referring to FIGS. 4-5 and 6, the material covering side panel 40 is attached to the periphery of the material covering front panel 20 and rear panel 30. They are attached such that front frame retaining sleeve 26, rear frame retaining sleeve 36, front frame member 22, and rear frame member 32 are contained within the enclosure 10. The front and rear frame retaining sleeves 26 and 36 respectively, may be formed by attaching a narrow channel around the periphery of the web to envelop the frame member. Suitable methods for attachment include but are not limited to sewing, heat sealing, gluing, and the like, and combinations thereof.

Figure 9A:
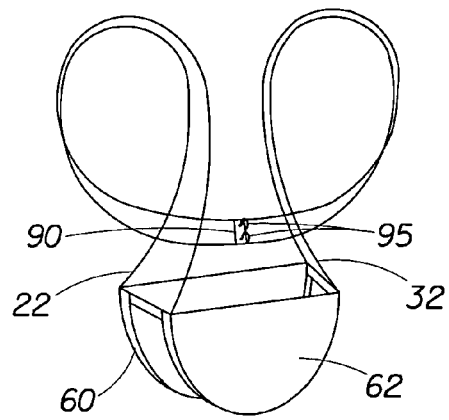
FIGS. 9A-9E are rear perspective views showing the enclosure of FIG. 7 and FIGS. 8A-8D.
Figure 9B:
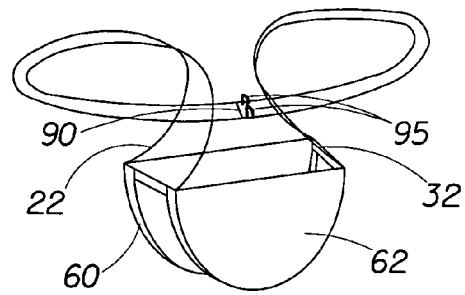
Figure 9C:
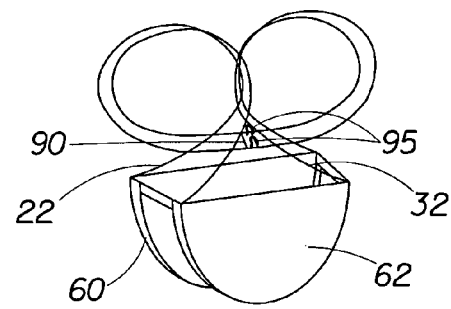
Figure 9D:
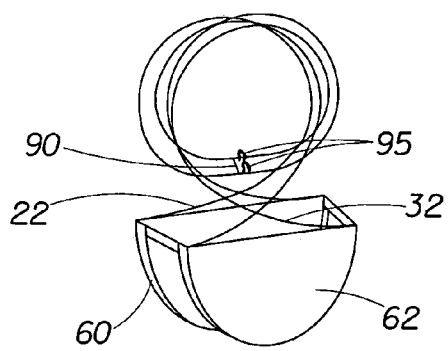
Figure 9E:
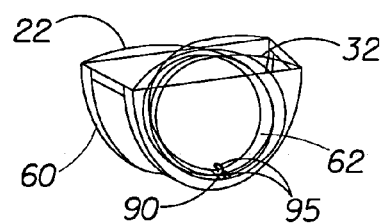

In addition to front panel 20 and rear panel 30, front rigid support member 60 and back rigid support member 62 may be used if desired to provide additional support to the frame members such as front frame member 22. Because of the open nature of the front panel 20, the material may not provide enough tension to hold the front frame member 22 into the desired configuration. The front rigid support member 60, when connected in any manner to the front frame member 22, provides this added support. When enclosure 10 is in a collapsed configuration such as shown in FIG. 9E, front and rear rigid support members 60 and 62 also provide a shell around enclosure 10 allowing for ease of portability. The front and back rigid support member may be made of any rigid or semi-rigid material such as PET, PETG, PC, high density polyethylene ("HDPE"), polypropylene ("PP"), and the like, but can also be made of more flexible materials and fabrics.

Side support member 64 and 66 as shown in FIG. 7 may be attached to both front and back frame members 22 and 32 so as to provide tension and maintain separation between front frame member 22 and back frame member 32. Side support members 64 and 66 can be made of a variety of materials including but not limited to rigid plastic (non-limiting examples of which include PET, PETG, PC, HDPE, PP), loops of metal wire, and the like.

Referring to FIGS. 8A-8D and 9A-9E, the skeleton of FIG. 7 is shown going from an expanded configuration to a partially collapsed configuration. To collapse the enclosure to its compact state, the moveable closure member 50 (see FIGS. 4 and 10) may be removed from enclosure 10 and the front and rear frame members 22 and 32 are compressed together and the top of the enclosure is rolled forward.

The top of enclosure 10 is folded so as to form small loops. The loops if desired may be tucked between the front and rear rigid support members 60 and 62. After collapsing frame members 22 and 32 into the front and back rigid support members 60 and 62, moveable closure member 50 is then rolled up to form a compact, easy to store and transport enclosure 10.

Referring to FIGS. 4-5 and 7, an exterior hanging member 70 may be used if desired to hang enclosure 10 from a structure such as a door, bar, etc. Exterior hanging member 70 may be connected to attachment member 90. In the embodiment shown, a user can optionally use either door hook 72 or rod hook 74 if desired by turning exterior hanging member 70. Adjustable height slots 76 allow the user to adjust the height at which enclosure 10 is suspended. Referring to FIG. 4, optional handle 78 can be incorporated in the exterior hanging member 70 so as to aid the user in reaching these components. A flexible member, such as strap 73 may be used to connect exterior hanging member 70 with enclosure 10.

If a hook is used it may be a collapsing hook. Referring to FIG. 4, collapsing hook 80 allows a user the fold enclosure 10 to a flatter construction when suspended and not in use. Collapsing hook 80 is attached to exterior hanging strap 73. A user can fasten the front top panel and the rear top panel by passing the top flexible frame of enclosure 10 under the arms of collapsing hook 86.

Referring to FIGS. 7, 8A-8D, and 9A-9E, fabrics may be suspended within enclosure 10 by interior hanging member 95. Interior hanging member 95 is connected to attachment member 90. Interior hanging member 95 can be anything which allows fabric to be suspended within enclosure 10, non-limiting examples of which include a bar/rod, hook, hanger, or the like which will be familiar to those of ordinary skill in the art. Attachment member 90 may be made out of for example a lightweight plastic such as polyethylene or polypropylene.

Enclosure 10 can be free standing with the support of a frame, or can be suspended from a surface such as by exterior hanging member 70. Fabrics suspended in enclosure 10 can be weighted or stretched if desired to improve wrinkle reduction. Hanging weights and stretching devices will be known to those skilled in the art. The fabrics may to be treated to be mechanically stretched after placing them into the enclosure 10 and before starting the process. While not wishing to be bound by theory, it is believed that the stretching or so-called tensioning of the fabric helps the relaxation of wrinkles during the process.

Non-limiting examples of stretching systems include weighted clamps as well as light weight compactable or retractable stretching systems, wherein the system comprises a tensioning device like a spring. The latter systems have the benefit of not adding extra weight to the cleaning and refreshing apparatus, along with the possibility of adjusting tensioning force and direction as required. If used, these systems are typically attached to the bottom of enclosure 10. One example of such as system is a rollerblind that is conventionally used as sunfilter for cars and commercially available from Halfords. This system is a rollerblind which can be extended or compacted by means of a roll-up spring mechanism. Only slight modification of this system is needed to adapt it to the tensioning of a fabric. One non-limiting adaptation involves attaching the housing of this system to the bottom of enclosure 10 and providing one or more clamps at the other side so that the clamping and thus the stretching or tensioning of the fabric in the enclosure 10 is obtained. The tension of the spring can also be adjusted to the desired stretching force for a given fabric. The size of the clamp can vary so that more than one clamp may be attached to this system. Still, another variation involves having only one clamp that runs along or partly along the rollerblind tensioning system located opposite the housing of the system.

Referring to FIG. 4, a fan 100 along with fan activation system 103 may be included. Though shown to be attached to the sides of the bottom of enclosure 10, other locations for attaching fan 100 and fan activation system 103 to enclosure 10 could be arranged without departing from the principles of the present invention. Fan activation system 103 determines the appropriate time for fan 100 to operate. Fan activation system 103 may include a power supply, a user interface, as well as a printed circuit board with electronic components. The electronic components of one embodiment are discussed below in greater detail. The power supply may be batteries such as a set of 4 AA-cell batteries delivering 6 Volts. The user interface could be a mechanical on-off switch, a LED light or any other device which may be utilized to communicate with the user. The printed circuit board contains a control circuitry to actuate the DC motor of fan 100. In general terms, the circuit is normally disconnected from the battery and there is no drain of current, thereby preserving battery life. When the mechanical switch is pressed momentarily, the circuit is powered by latching a relay. The PCB also contains a logic control to allow fan 100 to operate at specific times during the fabric treatment period. A bimetallic temperature-sensitive switch (not shown) could be used to control the fan 100. The switch may be placed in close proximity to the self-heating benefit composition so that it would turn on the motor at a preset temperature range.

The fan assembly may include certain safety features, such as a fan housing front having a gridded cover that can be used to prevent manual access to the fan while in operation. The fan motor may be held in place and located in the center of the fan assembly 100 by a fan mounting piece. Suitable fans which may be used for this purpose include axial and centrifugal fans. The fan and the fan inlet may be within the interior void space of enclosure 10 so that at least a portion of the air within the void space of enclosure 10 is recirculated.

Air velocities generated by fan 100 around the fabric in enclosure 10 is generally between about 0.05 m/s to about 10 m/s, or between about 0.1 m/s to about 5 m/s, or between about 0.5 m/s to about 2 m/s. Additionally, a filter may be optionally provided in the interior of or exterior to enclosure 10.

Figure 11:
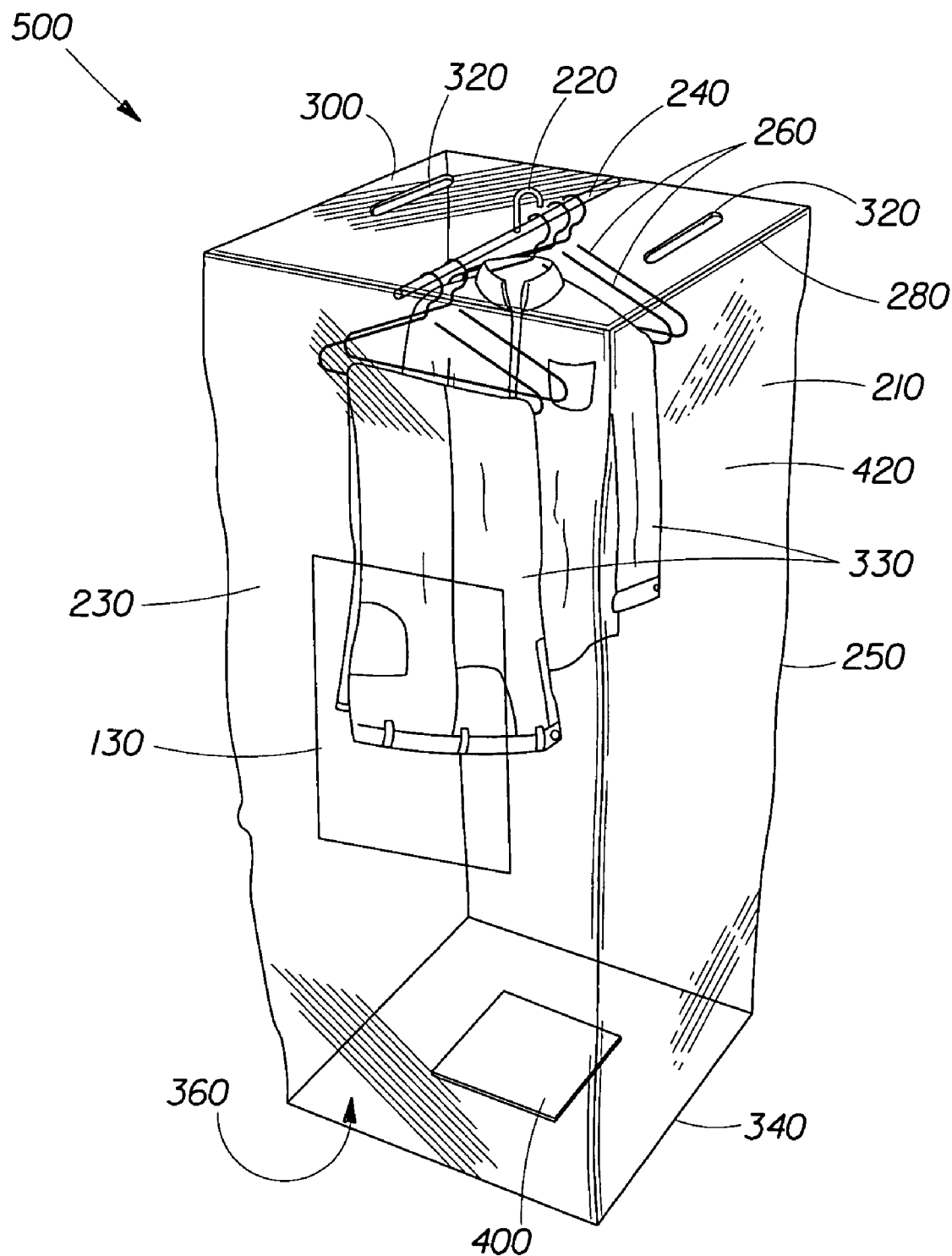
FIG. 11 is a front perspective view of another embodiment of an enclosure made in accordance with the present invention.

Referring to FIG. 11, a non-limiting embodiment of another enclosure made in accordance with the present invention is shown. Enclosure 500 comprises side panels 210 that define an interior chamber 230, which can be accessed via opening 130. Opening 130 is typically covered during operation of enclosure 500 by way of sealing. Sealing can be accomplished by virtually any known sealing device non-limiting examples of which include magnets, zippers, tape, ZIP LOCK® seals, and hook and loop type fasteners, for example VELCRO®.

Enclosure 500 can be constructed from any appropriate materials, such as plastics, fabrics, metals and the like. In one non-limiting example, side panels 210, top panel 300 and bottom panel 360 may be constructed from plastic sheet material such as polyethylene, polypropylene, or combinations thereof. It is understood that this sheet material can be rigid or flexible. Panels 210, 300, and 360 can be clear, or if desired constructed of other materials non-limiting examples of which include opaque materials, UV blocking materials, or combinations thereof.

Fabric enclosure 500 optionally further comprises an upper frame 280, a bottom frame 340 and a side frame 250. These frames can be separate from one another, or they can be a unitary structure. One or more of these frames can be absent. If desired, rigid side panels can be employed to construct the enclosures of this invention, and hinges can be used to make the enclosure collapsible.

If a frame is employed, the frame may form a flexible, collapsible frame that when expanded forms a semi-rigid, three dimensional structure. Examples of collapsible structures are known, for example, in U.S. Pat. No. 5,038,812, issued on Aug. 13, 1991, to Norman. In general, flexible, collapsible frames, such as those found in Norman, are formed from material that is relatively strong but nevertheless flexible enough to allow it to be collapsed. An exemplary frame material is flat spring steel. The frame or frames can be sewn, glued or otherwise attached to the interior or the exterior of the enclosure. Likewise, the frame or frames can be free standing with the enclosure material hanging loosely over, or being expanded by the frame.

A vent may be used. The vent need not be a separate element. Vent 320 can be at any location within enclosure 500. The vent need not be a separate element. Specifically, enclosure 500 can be vented by natural leakage through seams and seals. Alternatively, a completely sealed interior chamber can be employed, particularly to increase the interior chamber temperature or vapor concentration.

Fabrics can be suspended in interior chamber 230 of enclosure 500 by any appropriate method. One such non-limiting method is shown wherein a bar 240 is provided to suspend hangers 260. In one non-limiting embodiment of this invention, substrate 400 may be placed on bottom panel 360. In another non-limiting embodiment not shown herein, substrate 400 can be suspended within enclosure 500, for example, by draping substrate 400 over hanger 260. Enclosure 500 can be free standing with the support of a rigid frame, as described above, or it can be suspended by hanging member 220 from a support means (not shown). If enclosure 500 is suspended by hanging member 220 no frame is required although frames are generally preferred to control and maintain the shape and volume of interior chamber 230.

It is understood that single or multiple substrates that may releasably contain one or more additional benefit agents can be used in the fabric treatment processes described herein. Moreover, the substrates can be placed virtually anywhere in the enclosure or adjacent the exterior of the enclosure as described above.

Turbulent air flow through the fabric articles, such as garments 330, may improve the fabric-to-air contact resulting in improved malodor removal from the fabric articles. Turbulent air flow can be achieved by any of a variety of methods that will be known to those skilled in the art. Non-limiting examples of methods that can produce turbulence within the interior chamber of a enclosure include: special enclosure designs; baffles within the enclosure; fans that are powered by battery, solar cells or other available power sources.

Vent

As previously indicated, the present invention may include a vent. A vent can serve a number of purposes, but typically a vent can be designed to help provide a method of exchanging the atmosphere inside the enclosure with ambient air from outside the enclosure. This may aid in drying fabrics after treatment. An automated, battery operated fan system is a convenient way to accomplish drying in conjunction with a vent. The vent in this case can be a single aperture with or without a flap that is actuated, or can be achieved by designing the enclosure with materials that evenly vent over a distributed area by the nature of the materials permeability. Another reason for a vent may be to allow for a small amount of the self-steaming benefit composition vapors to escape from the enclosure over the time of treatment. An example here would be to deliver a pleasant perfume odor/smell to the area where the treatment enclosure is being operated.

Kit for Treating Fabrics

The self-steaming benefit composition article and the enclosure may be provided together as a kit. When provided as a kit, the self-steaming benefit composition may be located exterior to the enclosure or located inside the enclosure. The enclosure may include a holder for holding the self-steaming benefit composition article. The holder may be located anywhere in the interior or exterior of the enclosure. The holder may be in fluid communication with the interior of the enclosure so that the self-steaming benefit composition intermingles with fabric which may be located in the interior of the enclosure. Suitable holders include those readily known to those of ordinary skill in the art one non-limiting example of which is a pouch. If desired, the self-steaming benefit composition could be placed directly into the pouch. Likewise, if an additional benefit composition is used it could be incorporated directly into the self-steaming benefit composition or as another non-limiting example it could be added directly to the pouch.

If desired, the self-steaming benefit composition article of the present invention may include a natural fold point thus allowing the article to be draped over a beam, hangar, or the like. Conversely, if desired, the article can be situated anywhere in the enclosure, for example it can be dropped into a pocket or attached to the enclosure. The article can also be situated outside the enclosure so long as the steam from the article is able to enter the enclosure.

Self-Instructing Article of Commerce

The present invention also encompasses articles of commerce comprising 1) the self-steaming benefit composition of the present invention, and 2) a set of instructions directing the user how to utilize the method of the present invention for cleaning/refreshing fabric.

In one embodiment, the article of commerce comprises the self-steaming benefit composition of the present invention in association with a set of instructions, wherein the instructions direct the user to follow the method of providing benefits to fabrics. For example, in one embodiment, such instructions would direct the user to 1) place the self-steaming benefit composition into an enclosure; 2) place the fabric in the enclosure; and 3) activate the self-steaming benefit composition.

Herein, "in association with", when referring to such instructions, means the instructions are either directly printed on the self-steaming benefit composition; directly printed on the packaging for the self-steaming benefit composition and/ or the enclosure; printed on a label attached to the packaging for the self-steaming benefit composition and/or the enclosure; or presented in a different manner including, but not limited to, a brochure, print advertisement, electronic advertisement, broadcast or internet advertisements, and/or other media, so as to communicate the set of instructions to a consumer of the self-steaming benefit composition and/or the enclosure.

Methods

Method for Determining Tapped Density of the Self-Steaming Component Premix

Tapped density refers to the bulk density of a material after tapping the container to induce settling. The following provides a method for determining the tapped density of the self-steaming component premix:

Pour the entire sample of the material to be measured into a large container with a lid. The container is tumbled and rolled to thoroughly mix the sample. A 100 ml graduated cylinder is placed on a balance and tared to zero. A sample from the container is then placed into the cylinder until the cylinder is approximately ½ to ¾ filled. Connect the filled graduated cylinder to a Tapped Density Tester and set the number of taps to 600 (a suitable Tapped Density Tester is the VK-50-1000 single platform unit available from VanKel Industries of Edison, N.J.). Once tapping is complete, the cylinder is removed and the volume of the material is recorded. Tapped density is determined by the following equation:

Tapped Density (g/ml)=$W/Y$ wherein:

W=the weight of the sample in grams
Y=the tapped volume of the sample in ml

EXAMPLES

Self-Steaming Benefit Composition

A self-steaming benefit composition for use with the present invention may be prepared as follows:

Self-Steaming Component Premix:

100 kg of the self-steaming component premix can be made as follows:

Add 5.58 kg of activated carbon to a mixer. A suitable mixer for this purpose is a Littleford Day Mixer. Add 4.28 kg of water to the mixer and mix for 10 minutes. Add 83.14 kg of sponge iron to the mixer and mix for 3 minutes. Add 7 kg of AGM (polyacrylate-Absorbent Gelling Material) to the mixer and mix for 12 minutes. This premix is than added to a container.

Brine:

100 kg of brine can be made as follows:

Add 88.3 kg of water (softened water may be used) to a mixer. Add 10.4 kg of sodium chloride and 1.3 kg of sodium thiosulfate to the mixer and mix for 15 minutes. The brine solution is then added to a container.

Self-Steaming Heat Cell:

The brine solution is added to the self-steaming component powder premix shortly before packing in the final overwrap container or added to the substrate containing the powder premix shortly before packing in the final overwrap. If desired, one or more additional benefit agent(s) may be added to the self-steaming heat cell. Non-limiting examples of this include adding the benefit agent to the carbon, adding to the premix formed, adding to a nonwoven substrate that contains the mixture, or combinations thereof.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention. All documents cited herein are in relevant part, incorporated by reference. The citation of any document is not to be construed as an admission that it is prior art with respect to the present invention.

What is claimed is:

1. A kit for treating fabric, said kit comprising:
   i) a self-steaming benefit composition comprising:
      a) from about 30% to about 80% by weight of iron powder;
      b) from about 0.5% to about 25% by weight carbon;
      c) from about 0.5% to about 10% by weight of metal salt;
      d) from about 1% to about 60% by weight of water;
      e) from about 0.1% to about 30% by weight of a water manager;
      f) oxygen at an amount sufficient to support the generation of steam; and
      g) an optional benefit agent,
   wherein the self-steaming benefit composition has a steam generation rate of at least about $2\times10^{-5}$ grams/minute of steam and
   ii) an enclosure wherein the enclosure is the core of a fabric roller;
   wherein the self-steaming benefit composition is delivered into the enclosure.

2. The kit of claim 1 wherein at least about $5\times10^{-5}$ grams steam/gram of self-steaming benefit composition is produced.

3. The kit of claim 1 wherein the iron powder is sponge iron.

4. The kit of claim 1 wherein the self-steaming benefit composition includes a self-steaming component wherein the dry mix of the self-steaming component has a tapped density of about 1 gram/ml to about 3 grams/ml.

5. The kit of claim 1 wherein the water manager is absorbent gelling material.

6. The kit of claim 1 wherein about 25% of the iron powder has a particle size diameter greater than about 250 μm.

7. The kit of claim 1 wherein the benefit agent is steam.

8. The kit of claim 7 further comprising an additional benefit agent wherein the additional benefit agent is delivered to fabric via direct volatilization, by physical delivery of the additional benefit agent to the fabric, or a combination thereof.

9. The kit of claim 8 wherein the additional benefit agent is delivered in the form of an azeotrope.

10. The kit of claim 1 wherein the mean particle size of the water manager is at least about 250 microns.

* * * * *